(12) United States Patent
Mandia

(10) Patent No.: US 12,008,340 B2
(45) Date of Patent: *Jun. 11, 2024

(54) SOFTWARE DEVELOPMENT KIT ENGAGEMENT MONITOR

(71) Applicant: Snap Inc., Santa Monica, CA (US)

(72) Inventor: Patrick Mandia, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,013

(22) Filed: Jan. 24, 2023

(65) Prior Publication Data

US 2023/0168865 A1    Jun. 1, 2023

Related U.S. Application Data

(63) Continuation of application No. 17/212,584, filed on Mar. 25, 2021, now Pat. No. 11,579,847.

(60) Provisional application No. 63/037,512, filed on Jun. 10, 2020.

(51) Int. Cl.
*G06F 8/20* (2018.01)
*G06F 8/60* (2018.01)
*G06F 9/54* (2006.01)
*G06F 11/34* (2006.01)

(52) U.S. Cl.
CPC .............. *G06F 8/20* (2013.01); *G06F 8/60* (2013.01); *G06F 9/542* (2013.01); *G06F 11/3438* (2013.01)

(58) Field of Classification Search
CPC ... G06F 8/20; G06F 8/60; G06F 9/542; G06F 11/3438; G06F 2201/86; G06F 11/302
See application file for complete search history.

(56) References Cited

U.S. PATENT DOCUMENTS

| | | | | |
|---|---|---|---|---|
| 9,483,876 | B2 * | 11/2016 | Polo | G06T 19/006 |
| 10,455,378 | B2 * | 10/2019 | Rakovitsky | G06F 11/3438 |
| 10,502,580 | B2 * | 12/2019 | Choi | G01C 21/3602 |
| 10,579,245 | B1 * | 3/2020 | White | G06F 3/0482 |
| 11,127,179 | B2 * | 9/2021 | Gum | G06T 11/60 |

(Continued)

FOREIGN PATENT DOCUMENTS

| | | |
|---|---|---|
| CN | 103488489 A | 1/2014 |
| CN | 115698946 A | 2/2023 |

(Continued)

OTHER PUBLICATIONS

"U.S. Appl. No. 17/212,584, Examiner Interview Summary dated Apr. 28, 2022", 2 pgs.

(Continued)

*Primary Examiner* — Matthew J Brophy
(74) *Attorney, Agent, or Firm* — Schwegman Lundberg & Woessner, P.A.

(57) ABSTRACT

An example developer tools system provided by a messaging system includes a software development kit (SKD) engagement monitor that permits capturing app open events in third party resources (e.g., third party apps) that use the developer tools system. The SKD engagement monitor is configured to operate in a manner that preserves privacy of the third party developers and avoids conveying to the messaging system backend environment personally identifiable information (PII) about the third party resource usage.

20 Claims, 8 Drawing Sheets

(56) References Cited

U.S. PATENT DOCUMENTS

| | | |
|---|---|---|
| 11,579,847 B2 | 2/2023 | Mandia |
| 2010/0159898 A1* | 6/2010 | Krzyzanowski ... G06Q 30/0601 455/414.1 |
| 2012/0036245 A1* | 2/2012 | Dare .................. H04L 65/1063 709/223 |
| 2012/0036442 A1* | 2/2012 | Dare ........................ G06F 8/60 715/736 |
| 2013/0127980 A1* | 5/2013 | Haddick ................ G06F 3/013 348/14.08 |
| 2013/0278631 A1* | 10/2013 | Border ................ G06F 3/04842 345/633 |
| 2015/0007145 A1* | 1/2015 | Pierce ................ G06F 11/3466 717/130 |
| 2015/0052577 A1* | 2/2015 | Lim ..................... H04L 63/105 726/1 |
| 2015/0172146 A1 | 6/2015 | Mahaffey et al. |
| 2016/0044091 A1* | 2/2016 | Doumet .................... G06F 8/70 715/744 |
| 2016/0087868 A1 | 3/2016 | Polychronis |
| 2016/0171540 A1* | 6/2016 | Mangipudi ........ G06Q 30/0255 705/14.53 |
| 2016/0224798 A1* | 8/2016 | Lim ..................... H04L 63/104 |
| 2016/0316034 A1* | 10/2016 | Herrick .................. H04L 67/02 |
| 2017/0142125 A1* | 5/2017 | Lim ..................... H04L 63/205 |
| 2017/0178253 A1* | 6/2017 | Koufogiannakis .... G06Q 50/01 |
| 2017/0353561 A1 | 12/2017 | Aliabadi et al. |
| 2018/0121461 A1* | 5/2018 | Natarajan ........... G06F 16/1748 |
| 2018/0274936 A1* | 9/2018 | Choi ..................... H04N 7/185 |
| 2018/0329591 A1* | 11/2018 | Gunther ................ G06F 3/0483 |
| 2018/0332447 A1* | 11/2018 | Rakovitsky ............. H04W 4/14 |
| 2018/0365085 A1 | 12/2018 | Li |
| 2018/0375943 A1* | 12/2018 | Lowry .................. H04L 69/329 |
| 2019/0158616 A1* | 5/2019 | Herrick .................. H04L 63/10 |
| 2019/0379593 A1 | 12/2019 | Polychronis |
| 2020/0092679 A1 | 3/2020 | Fyfe et al. |
| 2020/0097160 A1* | 3/2020 | White .................. G06F 3/04847 |
| 2020/0264859 A1* | 8/2020 | Jones ..................... G06F 16/953 |
| 2020/0401418 A1* | 12/2020 | Regev ..................... G06F 9/445 |
| 2021/0044555 A1* | 2/2021 | Orr ..................... H04L 65/1069 |
| 2021/0173633 A1* | 6/2021 | Criscuolo ............... G06F 8/656 |
| 2021/0224365 A1* | 7/2021 | Huang .................. H04L 67/535 |
| 2021/0389932 A1 | 12/2021 | Mandia |

FOREIGN PATENT DOCUMENTS

| | | |
|---|---|---|
| KR | 20180037342 A | 4/2018 |
| WO | WO-2018153207 A1 | 8/2018 |
| WO | WO-2021252235 A1 | 12/2021 |

OTHER PUBLICATIONS

"U.S. Appl. No. 17/212,584, Final Office Action dated Jul. 28, 2022", 15 pgs.

"U.S. Appl. No. 17/212,584, Non Final Office Action dated Dec. 21, 2021", 13 pgs.

"U.S. Appl. No. 17/212,584, Notice of Allowance dated Oct. 7, 2022", 11 pgs.

"U.S. Appl. No. 17/212,584, Response filed Apr. 21, 2022 to Non Final Office Action dated Dec. 21, 2021", 8 pgs.

"U.S. Appl. No. 17/212,584, Response filed Sep. 27, 2022 to Final Office Action dated Jul. 28, 2022", 11 pgs.

"International Application Serial No. PCT/US2021/035383, International Search Report dated Sep. 10, 2021", 4 pgs.

"International Application Serial No. PCT/US2021/035383, Written Opinion dated Sep. 10, 2021", 3 pgs.

"Chinese Application Serial No. 202180041351.5, Voluntary Amendment Filed Apr. 26, 2023", w/ English Claims, 19 pgs.

"International Application Serial No. PCT/US2021/035383, International Preliminary Report on Patentability dated Dec. 22, 2022", 5 pgs.

"Chinese Application Serial No. 202180041351.5, Office Action mailed Sep. 23, 2023", w/English Translation, 16 pgs.

"Chinese Application Serial No. 202180041351.5, Office Action mailed Feb. 6, 2024", w/ English Translation, 10 pgs.

"Chinese Application Serial No. 202180041351.5, Response filed Mar. 25, 2024 to Office Action mailed Feb. 6, 2024", W/English Claims, 14 pgs.

\* cited by examiner

SOFTWARE DEVELOPMENT KIT ENGAGEMENT MONITOR

CLAIM OF PRIORITY

This application is a continuation of U.S. patent application Ser. No. 17/212,584, filed on Mar. 25, 2021, which claims the benefit of priority to U.S. Provisional Application Ser. No. 63/037,512, filed on Jun. 10, 2020, which is incorporated herein by reference in its entirety.

TECHNICAL FIELD

The present disclosure relates generally to construction and utilization of software developer kits (SDKs).

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, can be designed to run on a mobile device such as a phone, a tablet, or a wearable device, while having a backend service provided on a server computer system to perform operations that may require resources greater than is reasonable to perform at a client device (e.g., storing large amounts of data or performing computationally expensive processing). For example, a messaging system may provide various tools for modifying or augmenting content, to utilize a camera of a mobile device together with the content augmentation tools, and to share the captured content via a network communication. Selected functionality of a computer-implemented application may be made available to developers of third party apps by means of one or more SDKs.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
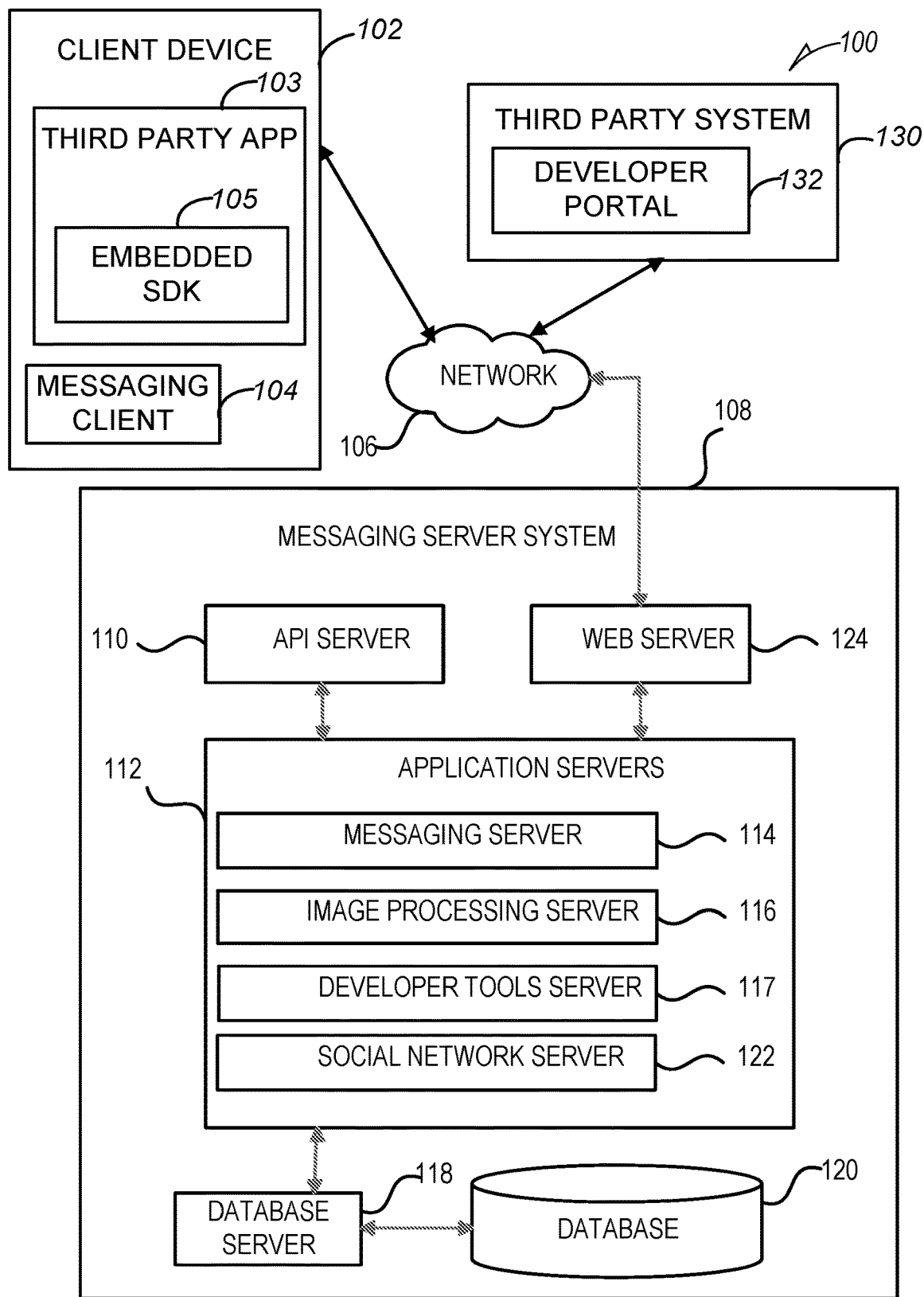
FIG. 1 is a diagrammatic representation of a networked environment in which an SDK engagement monitor may be deployed, in accordance with some examples.

Embodiments of the present disclosure improve the functionality of computer-implemented applications by enhancing visibility into actual and potential utilization of an SDK when it is embedded in a third party app, while preserving users' privacy by avoiding communicating personally identifiable information (PII) about third party app users to the SDK provider system. The technical problem of monitoring potential engagement of an SDK embedded in a third party app is addressed by constructing an SKD engagement monitor and including the SKD engagement monitor in the SDK embedded in the third party app. Because opening of a third party app that includes an embedded SDK can potentially be followed by operations that engage the SDK to access one or more features provided by the backend system that supports the SDK, the app open events and various associated information can be useful in predicting utilization of the SDK.

The SDK engagement monitor is configured to capture system-initiated and user-initiated events indicative of opening of the third party app where the SDK is embedded. An event indicative of opening of the third party app is referred to as an app open event, for the purposes of this description. In response to detecting an app open event, the SDK engagement monitor derives from the detected event associated information that is free from PPI and communicates the derived associated information to the SDK provider system, which is the backend system that supports the SDK. A communication triggered by the SDK engagement monitor detecting an app open event, which includes derived associated information that is free from PPI is referred to, for the purposes of this disclosure, as an open event message.

For the purposes of this description, the SDK engagement monitor and the one or more SDKs, each facilitating access to a selected feature provided by the SDK provider system, when embedded in a third party app, collectively are referred to as an embedded SDK. The SKD engagement monitor may be used in the context of a messaging system that hosts a backend service for an associated messaging client, where the backend service for an associated messaging client is the SDK provider system.

The messaging system, comprising a messaging client executing at a client device and supported by a backend service provided at a messaging server system, is configured to permit users to capture images and videos with a camera of a client device that hosts the messaging client and to share the captured content with other users via a network communication. The messaging system can be configured to provide augmented reality (AR) components accessible via the messaging client. AR components can be used to modify content captured by a camera, such as, by overlaying pictures or animation on top of the captured image or video frame, or by adding three-dimensional (3D) effects, objects, characters, and transformations.

The messaging system can include functionality that permits a user to combine several content items, such as images or short videos, into a collection that can be broadcasted as these content items are being captured by using a camera view screen of the messaging client. A camera view screen is a screen displayed by the messaging client, which includes the output of a digital image sensor of a camera, a user selectable element actionable to capture an image by the camera or to start and stop video recording, and that can also display one or more user selectable elements representing respective AR components. The messaging system can also permit users to create personalized cartoon avatars of themselves, which can be included into messages to make the online communication more entertaining and expressive. In order to permit third party developers to use some or all of these features—such as AR experiences, collections of content items and personalized cartoon avatars—the messaging system may use a developer tools server that maintains one or more SDKs that can be embedded in a third party app, together with the SKD engagement monitor, as an embedded SDK. Examples of the one or more SDKs that can be embedded in a third party app, together with the SKD engagement monitor, as an embedded SDK include an AR kit, a collections kit and a login kit. The AR kit is configured to permit users of a third party app to access one or more of the AR components provided by the messaging system and/or to facilitate creation of new AR components by developers of a third party app. For example, the AR kit may provide users of the third party app with access to an AR component that detects the head position of the person being captured by the digital image sensor and to overlay an image of a party hat over the detected head position, such that the viewer would see the person presented on the camera view screen as wearing the party hat. When the embedded SDK detects an event indicating engagement of the augmented reality kit, such as a user-initiated gesture with respect to an associated visual control, the embedded SDK launches the messaging client installed at the same client device to a camera view screen provided by the messaging client.

The collections kit is configured to permit users of a third party app to access functionality that permits a user to combine several content items, such as images or short videos, into a collection that can be broadcasted as these content items are being captured. The login kit permits a user of the messaging system to connect to a third party app using the credentials of the user with respect to the messaging system.

The SDK engagement monitor, which is included in an embedded SDK, detects each app open event and reports it to the messaging system in the form of an open event message. The app open event is indicative of the operation of launching of an app, as well as of the operation of foregrounding of an app. For the purposes of this description, the operation of removing the foreground focus from an app executing at a client device is termed backgrounding. The operation of restoring the foreground focus to the app is referred to as foregrounding. Foregrounding is different from launching of an app, as the app that is being foregrounded has been previously launched and is executing in the background. An app open event may be caused, for example, by activation of a notification from the app, where the notification is presented at the screen of the client device, a selection of the app from a carousel of one or more apps executing in the background at the client device, or activation of the icon representing the app at the screen of the client device.

The SDK engagement monitor monitors the number of app open events at the client device for each 24 hour period represented by a calendar date. Each time the SDK engagement monitor detects an app open event, the SDK engagement monitor updates a count of app open events for the calendar date stored at the client device. In some examples, the SDK engagement monitor generates a daily bucket identifier based on the updated count of app open events and includes in the open event message for communicating to the SDK provider system the generated daily bucket identifier instead of the updated count of app open events. The SDK engagement monitor includes in the open event message a calendar date associated with the app open event instead of the timestamp of the app open event. The calendar date associated with the app open event is generated by the SDK engagement monitor in the form of a day, a month and a year. The SDK engagement monitor generates the calendar date and the daily bucket identifier at the client device. Generating the calendar date and the daily bucket identifier at the client device and communicating, to the SDK provider system, a daily bucket identifier instead of the count of app open events and a calendar date instead of the timestamp of the app open event contributes to protecting third party app users' PPI from being revealed to the SDK provider system, as the SDK provider system can be operated by an entity that is distinct from an entity providing the third party app.

In some examples, the generating of the daily bucket identifier comprises setting the daily bucket identifier to the count of app open events (after updating it by increasing the count in response to the newly-detected app open event) if the updated count of app open events is less than a first value and setting the daily bucket identifier to a second value if the updated count of app open events is greater than or equal to the first value. For example, if the count of app open events is 10 or less, the SDK engagement monitor sets the daily bucket identifier to the count of app open events (if the count of app open events is 1, the SDK engagement monitor sets the daily bucket identifier to 1, if the count of app open events is 2, the SDK engagement monitor sets the daily bucket identifier to 2, if the count of app open events is 3, the SDK engagement monitor sets the daily bucket identifier to 3, and so on until the count of app open events reaches 10). If the count of app open events is greater than 10, the SDK engagement monitor sets the daily bucket identifier to some other predetermined value, such as 10 or any other number, and includes that value as the daily bucket identifier in every subsequent open event message for that calendar date. It will be understood that a daily bucket identifier may be generated using various different schemas, such as, for example, assigning a different daily bucket identifier to different ranges of values. For example, the bucket identifier "1" may be used to indicate that the number of detected events is between 1 and 3, the bucket identifier "2" may be used to indicate that the number of detected events is between 4 and 12, the bucket identifier "3" may be used to indicate that the number of detected events is greater than 12, and so on.

An open event message may include information in addition to the daily bucket identifier and the associated calendar date, such as an identification of the third party app. The SDK engagement monitor, in some examples, is also configured to determine which development kits are included in the embedded SDK and communicate respective identifications of one or more development kits in the embedded SDK to the SDK provider system as part of the open event message. An example of a development kit included in the embedded SDK is an augmented reality (AR) kit that provides to the third party app access to an AR experience in the SDK provider system. When the embedded SDK that includes an AR kit detects an event indicating engagement of the AR kit, the embedded SDK launches a messaging client provided by the SDK provider system to a camera view screen provided by the messaging client.

While the SDK engagement monitor is described below in the context of a messaging system, the methodologies described herein can be used advantageously in various computer implemented applications that utilize SDKs.

Networked Computing Environment

FIG. 1 is a block diagram showing an example system 100 for exchanging data (e.g., messages and associated content) over a network. The system 100 includes multiple instances of a client device 102, each of which hosts a number of applications, including a messaging client 104 and a third party app 103. The third party app 103 is configured to permit users to access functionality provided by a third party system 130.

Each messaging client 104 is communicatively coupled to other instances of the messaging client 104 and a messaging server system 108 via a network 106 (e.g., the Internet).

A messaging client 104 is configured to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as self-reported age of the user and records related to changes made by the user to their profile data.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The API server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server 114. The social network server 122 supports various social networking functions and services and makes these functions and services available to the messaging server 114.

Also shown in FIG. 1 is a developer tools server 117. The developer tools server 117 maintains one or more software developer kits (SDKs) that permit users to integrate some of the features provided by the messaging server system 108 across their app (also referred to as third party app). The functionality provided by the developer tools server 117 can be accessed from third party computer systems via a developer portal, which may be accessed via a web browser. A developer portal that provides third party computer systems (e.g., the third party system 130) with access to the functionality provided by the developer tools server 117, in some examples, can be downloaded to a third party computer system, in which case it may not require the use of a web browser. The third party system 130 is shown to include a developer portal 132. As explained above, the developer portal 132, can be accessed via a web browser executing on the third party system 130 or downloaded to the third party system 130. As mentioned above, the functionality provided by a third party system 130 can be accessed by users via the third party app 103. The third party app 103, which is installed on the client device 102, is shown to include an embedded SDK 105. The embedded SDK 105 includes the SDK engagement monitor described above and, also, one or more SDKs, each facilitating access to a selected feature or a set of features provided by the associated SDK provider system, namely, in this example, by the messaging server system 108.

System Architecture

Figure 2:
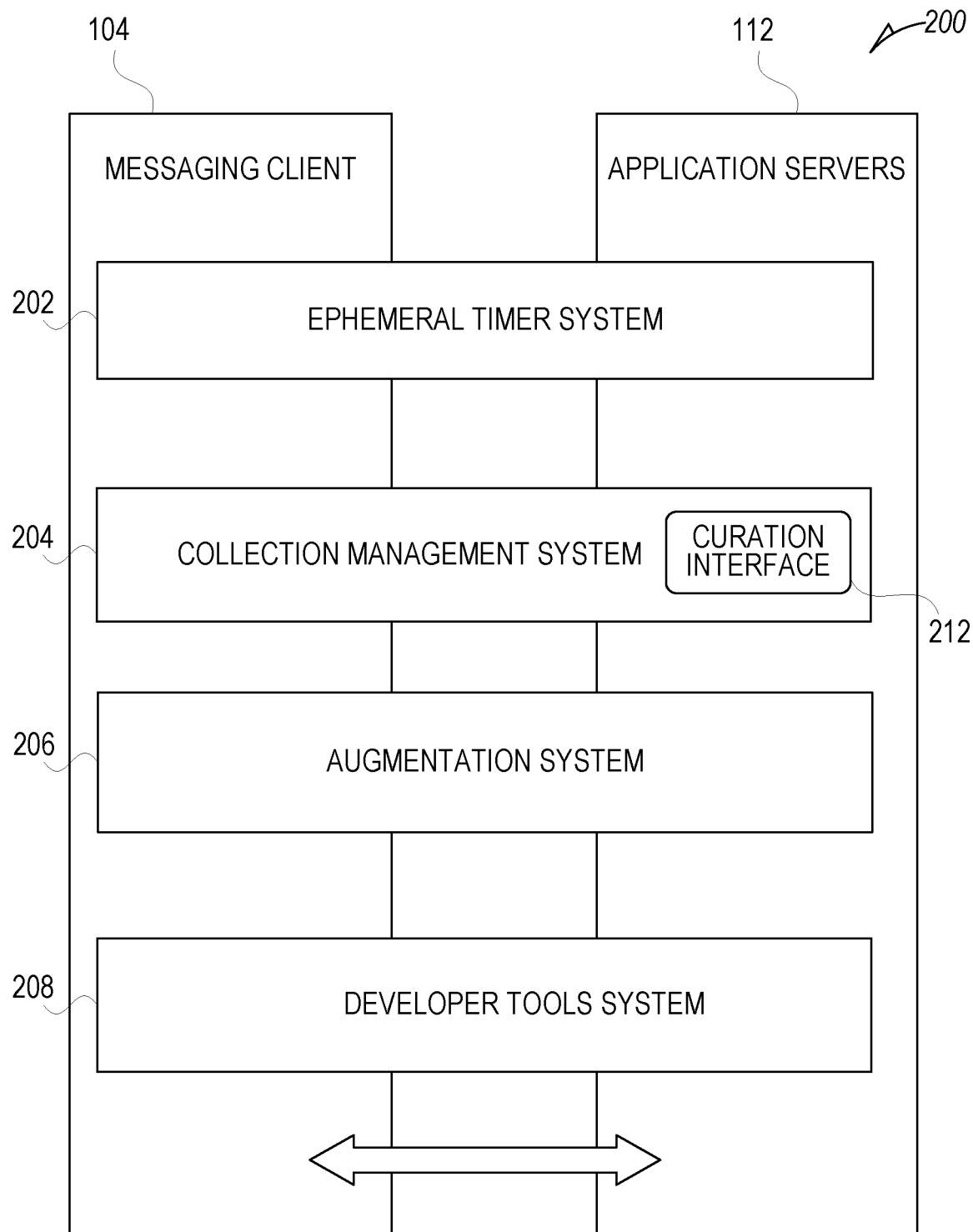
FIG. 2 is a diagrammatic representation of a messaging system, in accordance with some examples, that has both client-side and server-side functionality.

FIG. 2 is a block diagram illustrating further details regarding the system 100, according to some examples. Specifically, the system 100 is shown to comprise the messaging client 104, the developer portal 132, and the application servers 112. The system 100 embodies a number of subsystems, which are supported on the client-side by the messaging client 104 and/or the developer portal 132, and on the sever-side by the application servers 112. These subsystems include, for example, an ephemeral timer system 202, a collection management system 204, and an augmentation system 206.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

In some examples, the functionality provided by the collections management system 204 may be made available to third party developers for inclusion into the associated third party apps by the developer tools server 117.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the system 100. The media overlays may be stored in the database 120 and accessed through the database server 118.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

In some examples, the functionality provided by the augmentation system 206 may be made available to third party developers for inclusion into third party apps by the developer tools server 117.

Data Architecture

Figure 3:
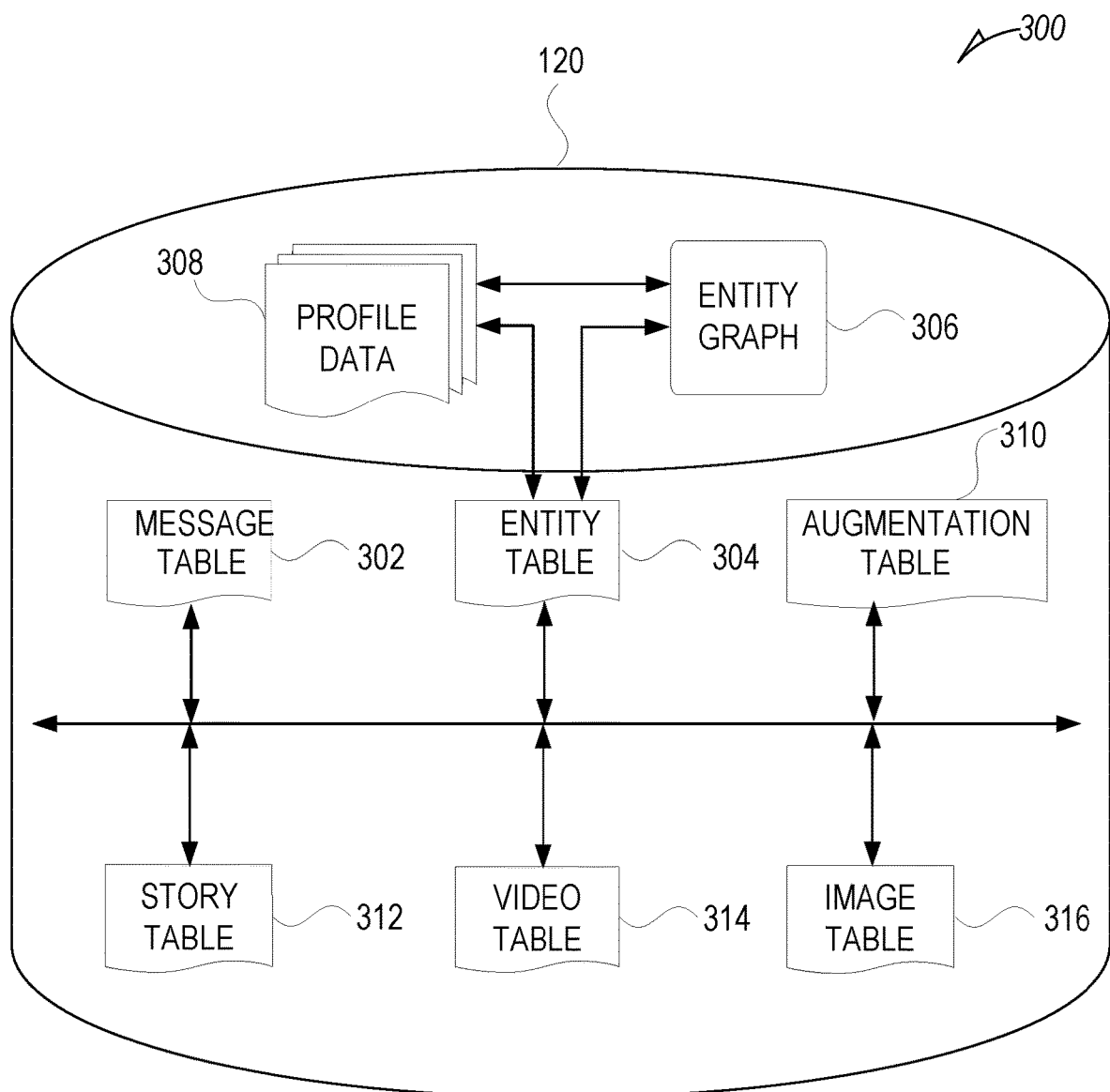
FIG. 3 is a diagrammatic representation of a data structure as maintained in a database, in accordance with some examples.

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated utilizing an SDK embedded in a third party app. Further details regarding information that may be included in a message, and included within the message data stored in the message table 302 is described below with reference to FIG. 4.

An entity table 304 stores entity data, and is linked (e.g., referentially) to an entity graph 306 and profile data 308.

Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using the AR component.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
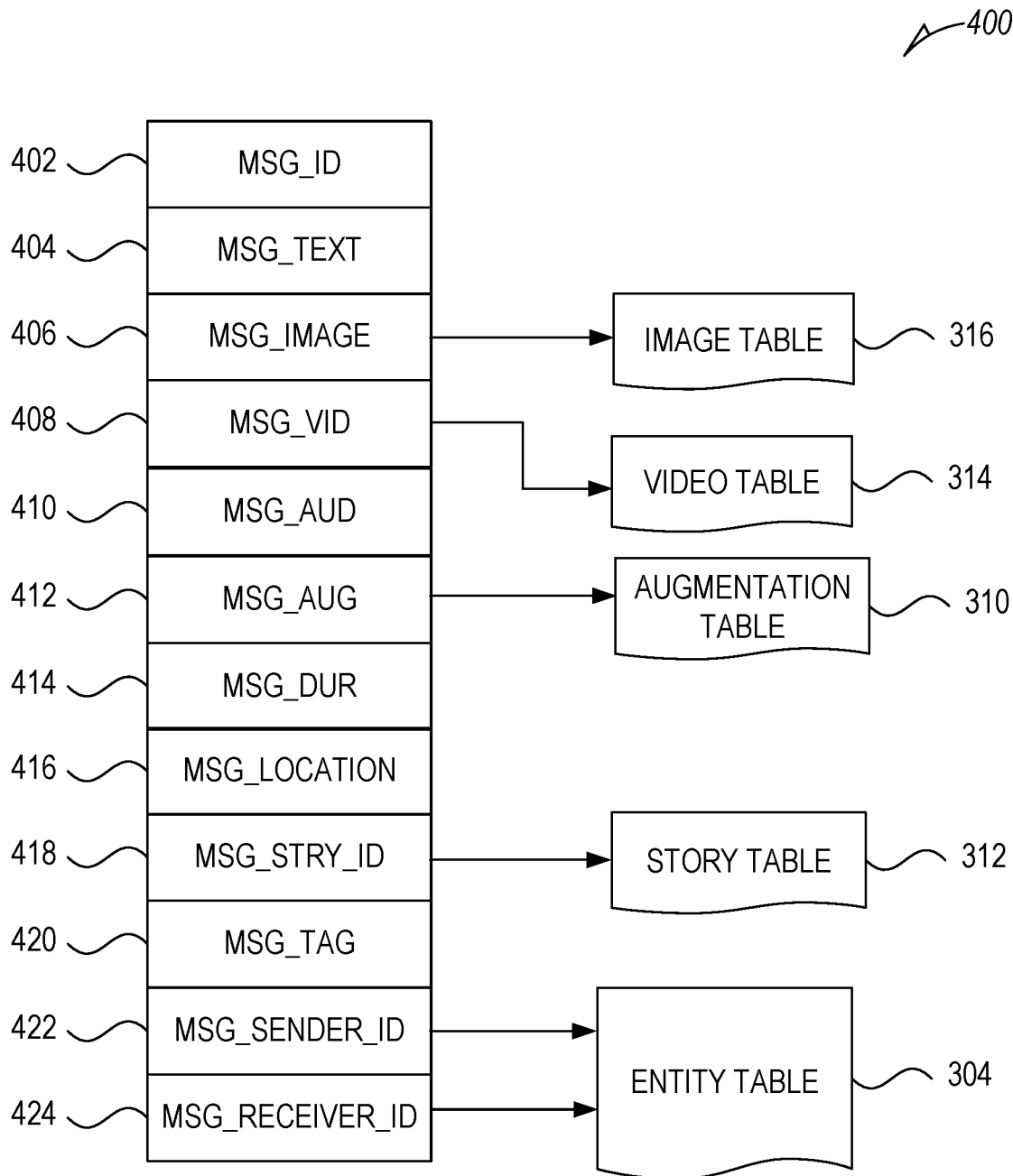
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316. Image data for a sent or received message 400, in some examples, is an image augmented utilizing an SDK embedded in a third party app.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
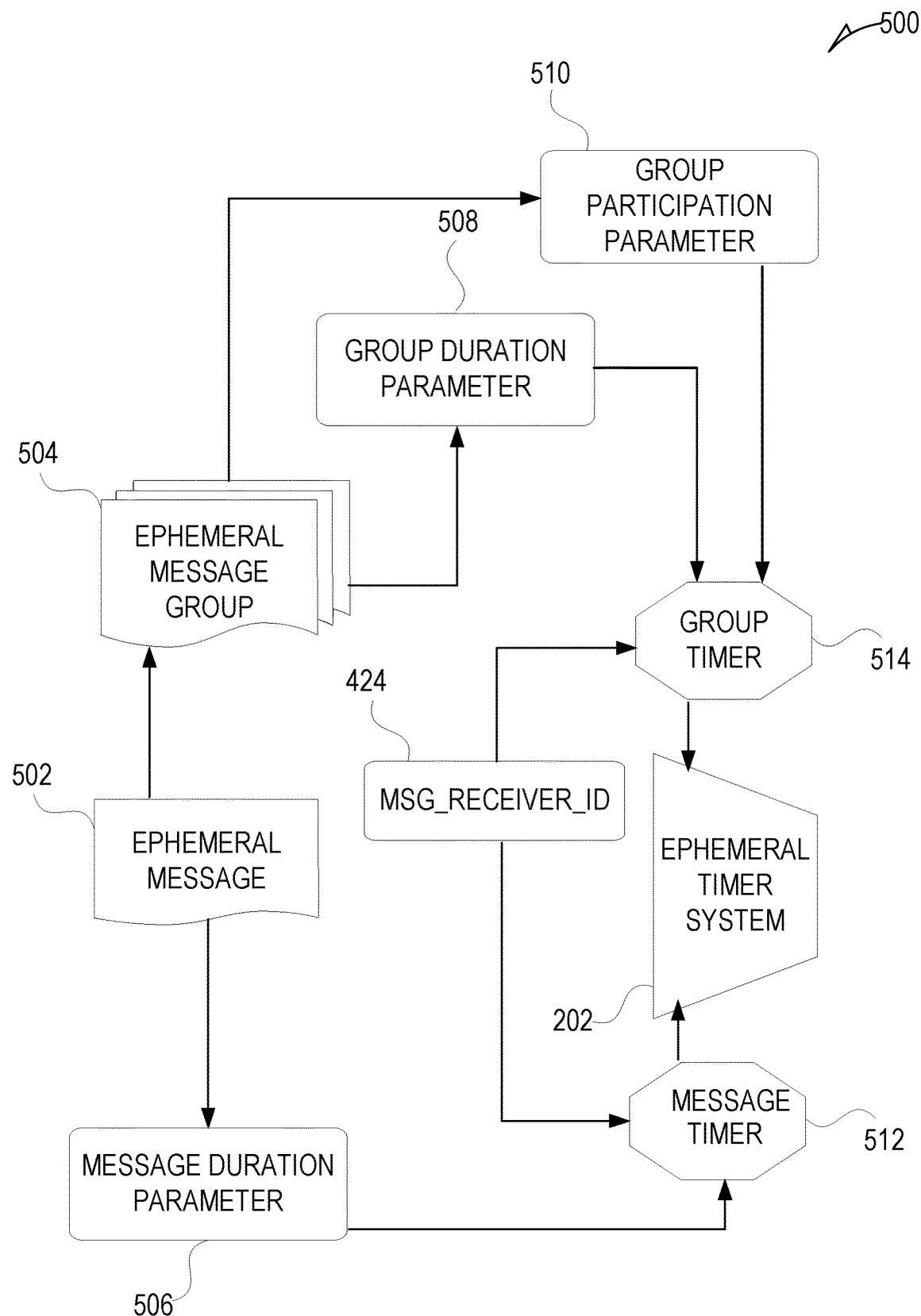
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image augmented utilizing an SDK embedded in a third party app.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Embedded SDK

Figure 6:
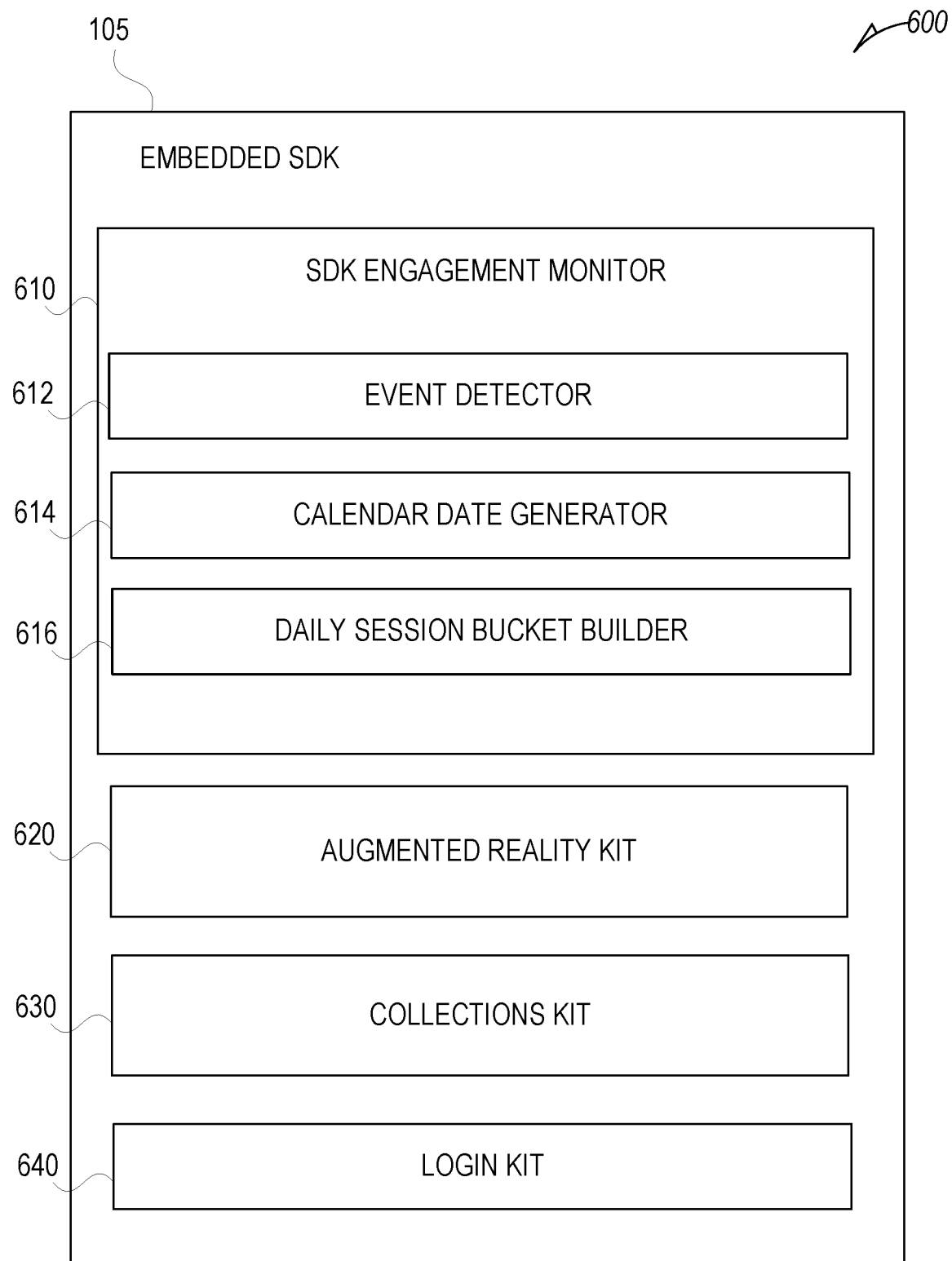
FIG. 6 is a diagrammatic representation of an embedded SKD, in accordance with some examples.

FIG. 6 is a diagrammatic representation of an embedded SDK 600, in accordance with some examples. As shown in FIG. 6, the embedded SDK 600 includes an SDK engagement monitor 610 and several development kits—an augmented reality kit 620, a collections kit 630, and a login kit 640.

The augmented reality kit 620 is configured to permit users of a third party app to access at least some of the features provided by the augmentation system 206, which is described with reference to FIG. 2. For example, the augmented reality kit 620 may provide users of the third party app with access to an AR component that detects the head position of the person being captured by the digital image sensor and to overlay an image of a party hat over the detected head position, such that the viewer would see the person presented on the camera view screen as wearing the party hat. When the embedded SDK 600 detects an event indicating engagement of the augmented reality kit 620, such as a user-initiated gesture with respect to an associated visual control, the embedded SDK 600 launches the messaging client 104 a camera view screen provided by the messaging client 104.

The collections kit 630 is configured to permit users of a third party app to access functionality that permits a user to combine several content items, such as images or short videos, into a collection that can be broadcasted as these content items are being captured. The login kit 640 is configured to permit users of a third party app to connect to a third party app using the credentials of the user with respect to the messaging system.

The SDK engagement monitor 610 includes an event detector 612, a calendar date generator 614, and a daily session bucket builder 616. The event detector 612 detects each app open event and reports it to the SDK provider system in the form of an open event message. As explained above, an app open event is indicative of the operation of launching of an app, as well as of the operation of foregrounding of an app. The calendar date generator 614 generates the calendar date associated with the app open event in the form of a day, a month and a year. The daily session bucket builder 616 updates a count of app open events for the calendar date stored at the client device each time the event detector 612 detects an app open event and generates a daily bucket identifier based on the updated count of app open events and includes the generated daily bucket identifier in the open event message for communicating to the SDK provider system. Some operation performed by the embedded SDK 600 are described with reference to FIG. 7.

Method for Monitoring Engagement of an Embedded SDK

Figure 7:
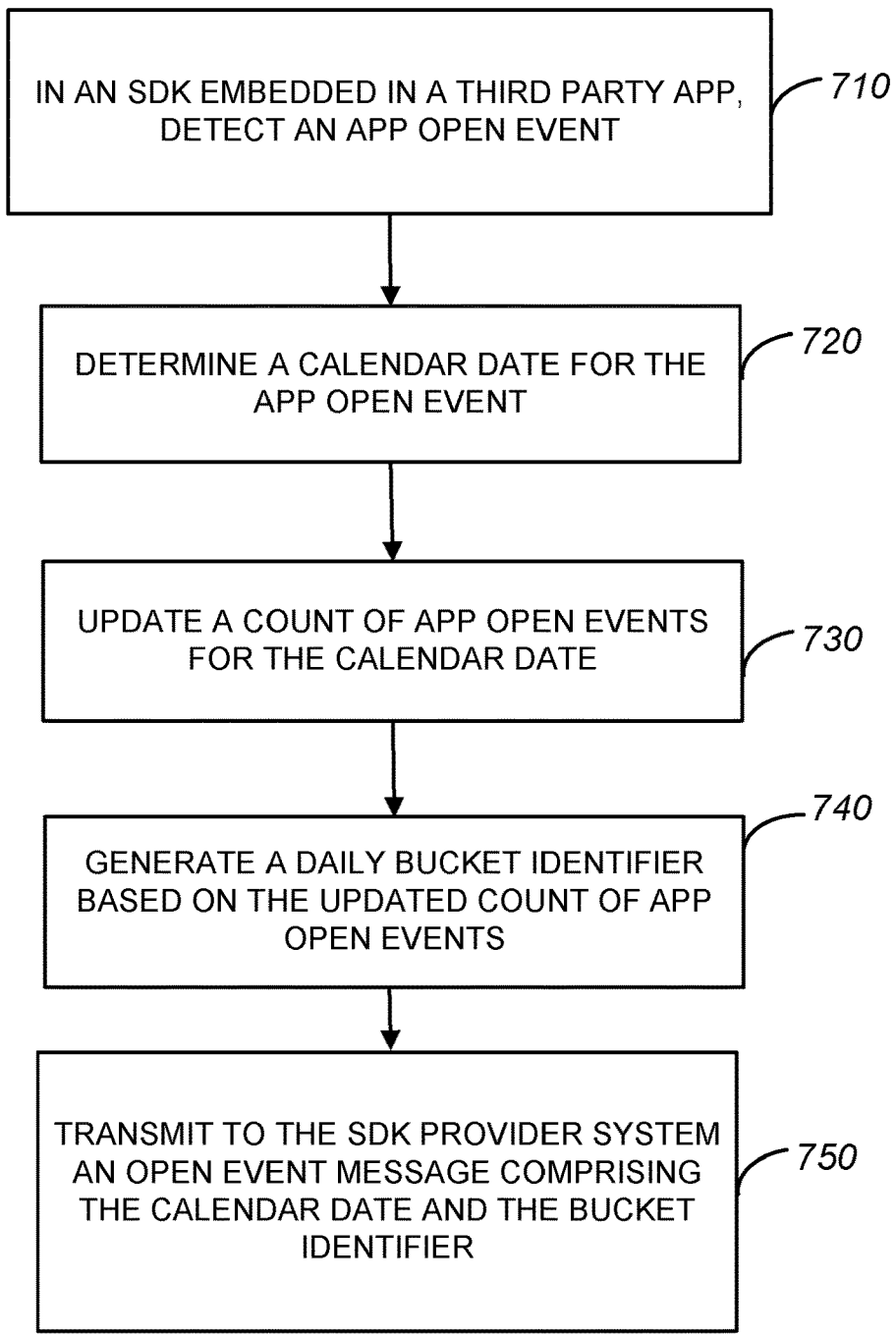
FIG. 7 is a flowchart of a method for monitoring engagement of an embedded SKD, in accordance with some examples.

FIG. 7 is a flowchart of a method for monitoring engagement of an embedded SDK, in accordance with some examples. Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, and the like. The operations of methods may be performed in whole or in part, may be performed in conjunction with some or all of the operations in other methods, and may be performed by any number of different systems, such as the systems described herein, or any portion thereof, such as a processor included in any of the systems.

In various examples, some or all processing logic resides at the client device 102. The method 700 commences at operation 710, when an app open event indicating opening of a third party app at a client device is detected in an SDK embedded in the third party app. At operation 720, the calendar date of the detected app open event is determined. At operation 730, a count of app open events for the calendar date is updated and a daily bucket identifier is generated based on the updated count of app open events, at operation 740. At operation 750, the embedded SDK transmits the calendar date and the bucket identifier to the SDK provider system in the form of an open event message, as described above.

Machine Architecture

Figure 8:
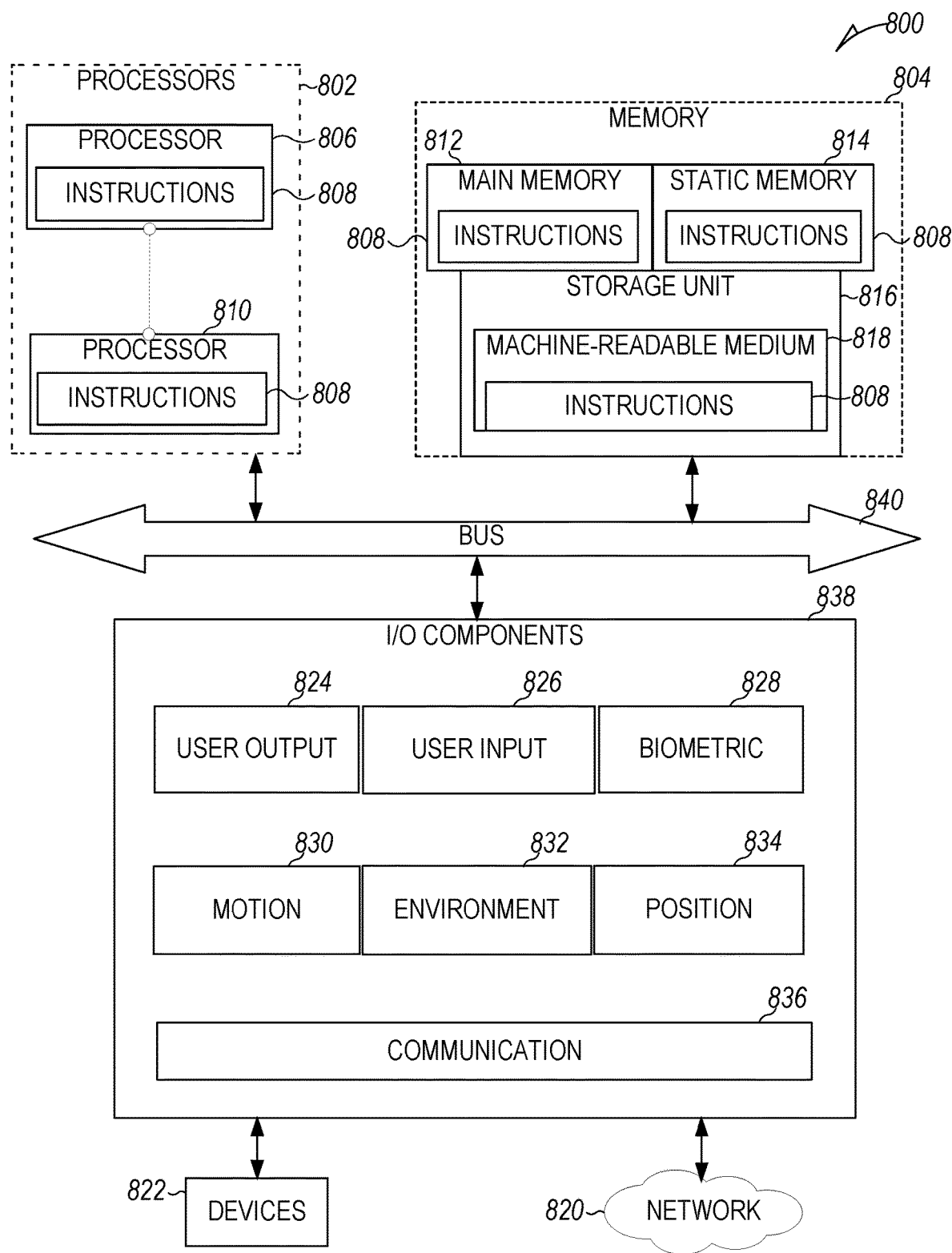
FIG. 8 is a diagrammatic representation of a machine in the form of a computer system, in accordance with some examples within which a set of instructions may be executed for causing the machine to perform any one or more of the methodologies discussed herein, in accordance with some examples.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 802, memory 804, and input/output I/O components 838, which may be configured to communicate with each other via a bus 840. In an example, the processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single-core, a single processor with multiple cores (e.g., a multi-core processor), multiple processors with a single core, multiple processors with multiples cores, or any combination thereof.

The memory 804 includes a main memory 812, a static memory 814, and a storage unit 816, both accessible to the processors 802 via the bus 840. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the Processor's cache memory), or any suitable combination thereof, during execution thereof by the machine 800.

The I/O components 838 may include a wide variety of components to receive input, provide output, produce output, transmit information, exchange information, capture measurements, and so on. The specific I/O components 838 that are included in a particular machine will depend on the type of machine. For example, portable machines such as mobile phones may include a touch input device or other such input mechanisms, while a headless server machine will likely not include such a touch input device. It will be appreciated that the I/O components 838 may include many other components that are not shown in FIG. 8. In various examples, the I/O components 838 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 838 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 838 further include communication components 836 operable to couple the machine 800 to a network 820 or devices 822 via respective coupling or connections. For example, the communication components 836 may include a network interface Component or another suitable device to interface with the network 820. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF418, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 812, static memory 814, and memory of the processors 802) and storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed examples.

The instructions 808 may be transmitted or received over the network 820, using a transmission medium, via a network interface device (e.g., a network interface component included in the communication components 836) and using any one of several well-known transfer protocols (e.g., hypertext transfer protocol (HTTP)). Similarly, the instructions 808 may be transmitted or received using a transmission medium via a coupling (e.g., a peer-to-peer coupling) to the devices 822.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 802 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   detecting, by an engagement software development kit (SDK) embedded in a third party app, an app open event indicating foregrounding of the third party app at a client device, the engagement SDK provided by an SDK provider system being distinct from a third party provider system supporting the third party app; and
   in response to the detecting of the app open event:
   identifying a second SDK embedded in the third party app that caused the app open event;
   determining a calendar date of the app open event, updating a count of app open events for the calendar date and generating a daily bucket identifier based on the updated count of app open events; and
   transmitting an open event message to the SDK provider system, the open event message comprising data identifying the second SDK embedded in the third party app that caused the app open event, the calendar date, and the bucket identifier.

2. The method of claim 1, wherein the app open event indicating foregrounding of the third party app at the client device comprises logging into the third party app at the client device using credentials associated with a messaging client supported by the SDK provider system.

3. The method of claim 1, wherein the app open event indicating foregrounding of the third party app at the client device comprises bringing the third party app to a foreground of a screen of the client device.

4. The method of claim 1, wherein the generating of the daily bucket identifier comprises setting the daily bucket identifier to the updated count of app open events if the updated count of app open events is less than a first value.

5. The method of claim 4, wherein the generating of the daily bucket identifier comprises setting the daily bucket identifier to a second value if the updated count of app open events is greater than or equal to the first value.

6. The method of claim 1, wherein the open event message comprises an identification of the third party app.

7. The method of claim 1, wherein the open event message comprises respective identifications of one or more other SDKs embedded in the third party app.

8. The method of claim 7, wherein an augmented reality (AR) kit from the one or more other SDKs embedded in the third party app provides the third party app with access to an AR experience in the SDK provider system.

9. The method of claim 8, wherein detecting the app open event indicating foregrounding of the third party app at the client device comprises:
- detecting an event indicating engagement of the AR kit and, in response, launching a messaging client supported by the SDK provider system to a camera view screen provided by the messaging client.

10. The method of claim 1, wherein the determining of the calendar date of the app open event, the updating of the count of app open events for the calendar date and the generating of the daily bucket identifier are performed at the client device.

11. A system comprising:
- one or more processors; and
- a non-transitory computer readable storage medium comprising instructions that when executed by the one or processors cause the system to perform operations comprising:
- detecting, by an engagement software development kit (SDK) embedded in a third party app, an app open event indicating foregrounding of the third party app at a client device, the engagement SDK provided by an SDK provider system being distinct from a third party provider system supporting the third party app; and
- in response to the detecting of the app open event:
- identifying a second SDK embedded in the third party app that caused the app open event;
- determining a calendar date of the app open event, updating a count of app open events for the calendar date and generating a daily bucket identifier based on the updated count of app open events; and
- transmitting an open event message to the SDK provider system, the open event message comprising data identifying the second SDK embedded in the third party app that caused the app open event, the calendar date, and the bucket identifier.

12. The system of claim 11, wherein the app open event indicating foregrounding of the third party app at the client device comprises logging into the third party app at the client device using credentials associated with a messaging client supported by the SDK provider system.

13. The system of claim 11, wherein the app open event indicating foregrounding of the third party app at the client device comprises bringing the third party app to a foreground of a screen of the client device.

14. The system of claim 11, wherein the generating of the daily bucket identifier comprises setting the daily bucket identifier to the updated count of app open events if the updated count of app open events is less than a first value.

15. The system of claim 14, wherein the generating of the daily bucket identifier comprises setting the daily bucket identifier to a second value if the updated count of app open events is greater than or equal to the first value.

16. The system of claim 11, wherein the open event message comprises an identification of the third party app.

17. The system of claim 11, wherein the open event message comprises respective identifications of one or more other SDKs embedded in the third party app.

18. The system of claim 17, wherein an augmented reality (AR) kit from the one or more other SDKs embedded in the third party app provides the third party app with access to an AR experience in the SDK provider system.

19. The system of claim 18, further comprising:
- detecting an event indicating engagement of the AR kit and, in response, launching a messaging client supported by the SDK provider system to a camera view screen provided by the messaging client.

20. A machine-readable non-transitory storage medium having instruction data executable by a machine to cause the machine to perform operations comprising:
- detecting, by an engagement software development kit (SDK) embedded in a third party app, an app open event indicating foregrounding of the third party app at a client device, the engagement SDK provided by an SDK provider system being distinct from a third party provider system supporting the third party app; and
- in response to the detecting of the app open event:
- identifying a second SDK embedded in the third party app that caused the app open event;
- determining a calendar date of the app open event, updating a count of app open events for the calendar date and generating a daily bucket identifier based on the updated count of app open events; and
- transmitting an open event message to the SDK provider system, the open event message comprising data identifying the second SDK embedded in the third party app that caused the app open event, the calendar date, and the bucket identifier.

\* \* \* \* \*